(12) United States Patent
Prusak

(10) Patent No.: US 7,691,312 B2
(45) Date of Patent: Apr. 6, 2010

(54) UNDERGROUND PIPE AND METHOD OF SECURING CONDUITS

(76) Inventor: Martin Prusak, Fürschwendi 793, Grub (CH) CH-9036

( * ) Notice: Subject to any disclaimer, the term of this patent is extended or adjusted under 35 U.S.C. 154(b) by 897 days.

(21) Appl. No.: 10/573,209

(22) PCT Filed: Jul. 7, 2003

(86) PCT No.: PCT/CH03/00447

§ 371 (c)(1),
(2), (4) Date: Aug. 22, 2006

(87) PCT Pub. No.: WO2005/029203

PCT Pub. Date: Mar. 31, 2005

(65) Prior Publication Data

US 2007/0052140 A1    Mar. 8, 2007

(30) Foreign Application Priority Data

Aug. 6, 2002  (CH) ................................. 1361/02

(51) Int. Cl.
*B28B 19/00*  (2006.01)

(52) U.S. Cl. ............... 264/269; 156/294; 138/108
(58) Field of Classification Search ............... 264/269, 264/516; 138/108; 156/294
See application file for complete search history.

(56) References Cited

U.S. PATENT DOCUMENTS

| 5,263,515 A | * | 11/1993 | Goodale | 138/98 |
| 5,674,030 A | * | 10/1997 | Sigel | 405/184.2 |
| 6,206,993 B1 | * | 3/2001 | Kiest et al. | 156/156 |
| 2001/0010781 A1 | | 8/2001 | Prusak | |

FOREIGN PATENT DOCUMENTS

| EP | 1 262 809 | 12/2002 |
| FR | 2 825 772 | 12/2002 |
| WO | WO 02/01107 | 1/2002 |

* cited by examiner

*Primary Examiner*—Christina Johnson
*Assistant Examiner*—Galen Hauth
(74) *Attorney, Agent, or Firm*—Volpe and Koenig, P.C.

(57) ABSTRACT

The invention relates to the curing of pipes (5) for receiving data cables, which are inserted into textile strips (4) and which are placed in discharge lines (1), wherein temporarily hot water or steam is guided through the pipes (5).

13 Claims, 2 Drawing Sheets

UNDERGROUND PIPE AND METHOD OF SECURING CONDUITS

Figure 1:
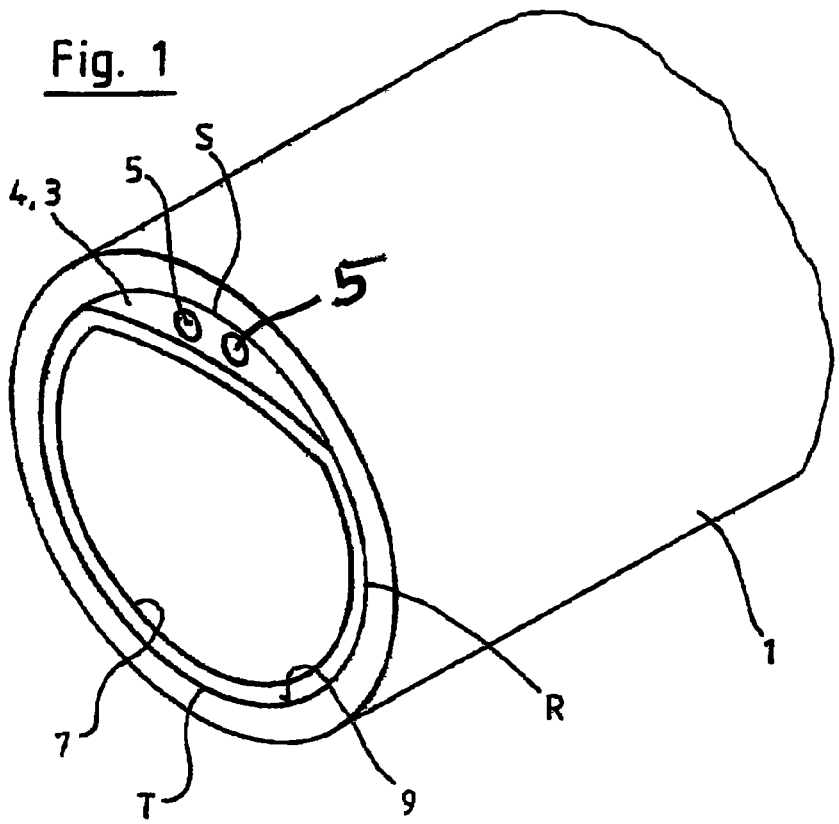

The object of the invention is a method for curing according to the preamble of claim 1.

Laying lines for communication and other purposes in occupied areas creates huge costs, in particular in urban areas. It has been known for some years to lay data transmission cables into sewer lines, i.e. discharge lines. Initially, these cables were directly inserted into the inside of the discharge lines using clamps and other mounting elements known from prior art and fastened using mechanical means.

The chemical and mechanical stress by sewage and mandatory cleaning measures using brushes or water jets, which can lead to the destruction of the inserted pipes, have lead to the search for new methods for laying such lines. One such method comprises for the wires to be inserted between a hose, comprising a curable material and inserted into the discharge line, and the wall of the channel or line. This allows, on the one hand, to repair damaged sewer lines and, on the other hand, to lay data wires protected from chemical and mechanical influences. This method is suitable in areas of sewer lines already marked for repair. However, if data lines are to be laid exclusively to arbitrarily reach buildings in a city without any digging required, the costs for such a method of laying are too high.

From WO 00/06843 it is known to insert data cables or pipes accepting data cables in a strip made from a textile web, interlaced yarn, or the like and to connect said strip at a suitable location within the sewer lines at its wall. For the optimal connection of the curable matrix of the strip, e.g., epoxy resin or the like, the strip is inserted into the line with a robot carrying a camera and subsequently pressed to the wall of the line with an extendable hose, and then the hose is filled with a hot medium, usually hot water. This hot water is circulated in the pipe for several hours and thus the curing of the matrix in the strip is achieved as well as a fixed connection to the line wall. Subsequently the hose is removed. The storage of large amounts of water and holding its temperature is expensive, considering, for example, that a line section measuring 200 meters in length with a line cross-section of one meter requires almost one hundred sixty thousand liters of hot water. This can be used only once, because usually there are no storage facilities for such amounts until another respective section of laid strip is ready to be cured.

The object of the present invention is therefore to provide a method to optimally and in a cost-effective manner cure pipes for data cables, electric cables, or a strip, made from a curable material, for carrying pipes guiding gas or liquids.

This object is attained by a method according to the features of the invention. Advantageous embodiments of the invention are defined below.

The temporary use of the pipes already inserted in the strip-shaped carriers to accept data cables for inserting the necessary curing heat is not only cheaper by several multiples but additionally the heat is inserted in a targeted manner only where it is needed. A few liters of water, heated in a simple manner, for example in a gas-operated boiler and/or kept warm during the curing process, is sufficient to cure a strip-shaped carrier with a length of a hundred meters or more. Although the heat is only guided and distributed in at least one pipe located in the strip-shaped carrier, it allows the carrier to be cured over its entire width. For pipes accepting several data wires, the hot water can be circulated by way of connecting the pipe ends at one end of the strip-shaped carrier and thus it is not necessary to return the water exiting at the end or to continuously feed fresh hot water. When at least two pipes are used the hot water can flow in opposite directions. This leads to an even heat influx to the strip-shaped carrier over the entire length of said strip.

The invention is explained in greater detail with an illustrated exemplary embodiment for laying pipes accepting data cables in discharge lines.

Figure 2:
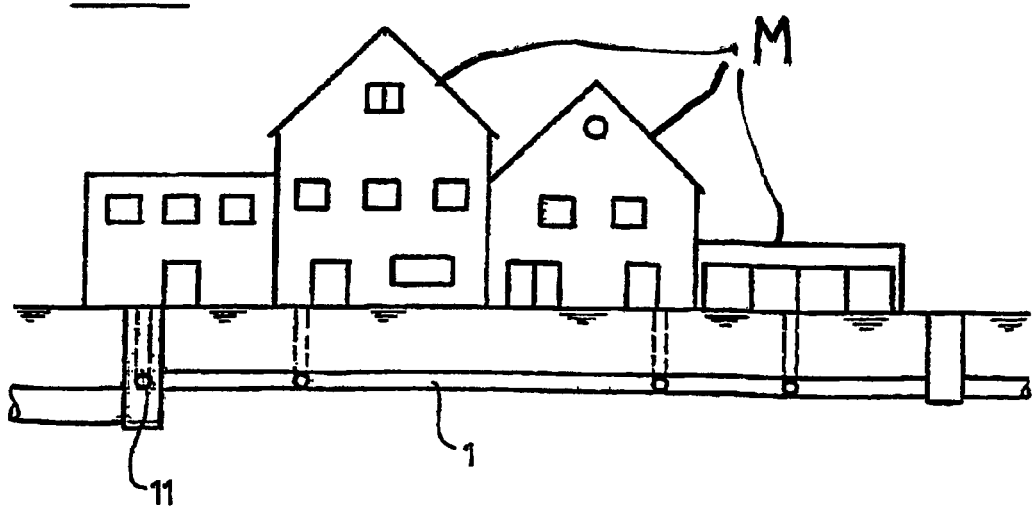
Figure 3:
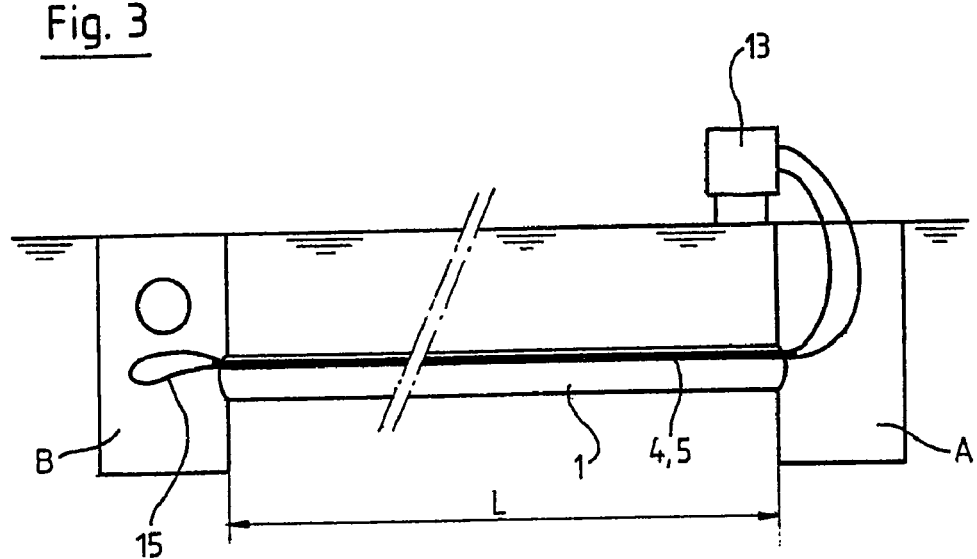
Figure 4:
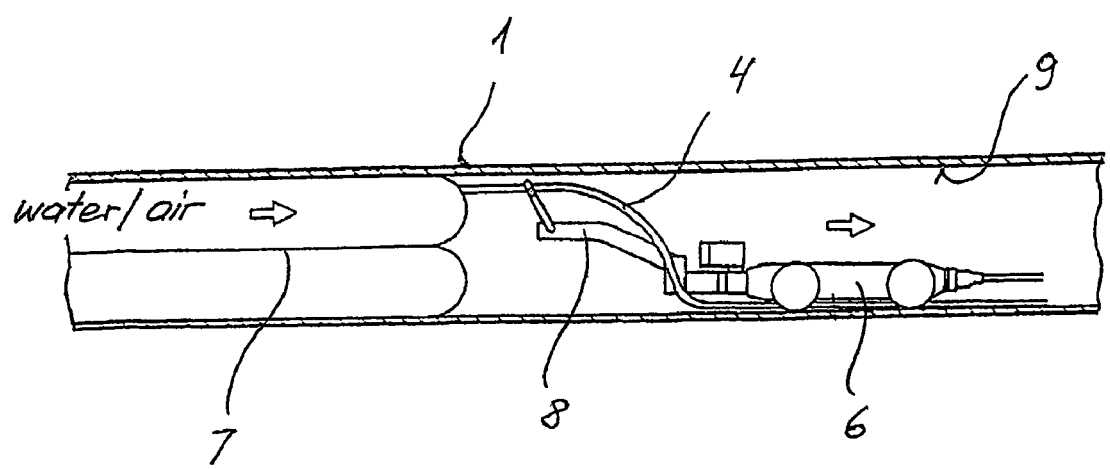

Shown are:

FIG. 1 a cross-section through a municipal discharge line or a supply line,

FIG. 2 a cross-section through a road having two shafts and a discharge line extending between said shafts, FIG. 3 a cross-section through a municipal discharge line between two shafts, in an enlargement, FIG. 4 a longitudinal cross-section through the line 1 and the flexible hose 7 during the eversion and contacting of the strip already positioned in the line laid by a robot.

In FIG. 1, a pipeline or channel made from steel, concrete, ceramics, or plastic is shown and marked with the reference numeral 1, with a sickle-shaped strip 4, made from a web or the like, being discernible in its apex S. In the strip 5, for example, two empty pipes, pipes 5 for short, are embedded for accepting data and electric cables. The strip-shaped carrier 4 is held in the position shown here by an elastic hose 7, filled with air, for example.

Of course, the strip 4 can also contact the interior wall of the line 9 laterally at R or at the bottom at T and it can be temporarily mounted here prior to the insertion of the hose 7 or be held by a robot 6 and/or the installation arm 8. This is particularly used when the strip 4 must be guided around laterally forking lines 11 in the discharge line 1 or when the strip 4 is to be inserted into laterally forking lines 11 (FIG. 3). The strip-shaped carrier 4 and/or the textile support structure forming the strip 4 is soaked with a thermally curable resin as a matrix 3. Inserting the strip 4 into the line 1 can occur in different manners. Here the preferred method uses a robot 6, which inserts the strip-shaped carrier 4 into the line 1 and puts it against the interior wall 9 of the line at a suitable position. Immediately thereafter the inflatable, flexible hose 7 is inserted, preferably in an eversion process, i.e. by blowing in air or pumping in water the eversion moves from the entry side towards the exit side and the hose 7 contacts the strip 4, and without any relative motion in reference to the strip 4 it is laid by the robot arm 8, and said strip is pressed evenly and tightly against the interior wall 9 of the line 1 (FIG. 4) as soon as sufficient pressure has been created in the line 7. When these preliminary works have been concluded, at least one pipe 5 is connected to a water heater, e.g., a boiler 13. The boiler 13 can be operated with gas or electricity. When two pipes 5 are inserted into the strip-shaped carrier 4, in a preferred embodiment of the invention, they can be connected to one another at the opposite end of section L of the discharge line by a loop-shaped connection pipe positioned such that hot water is guided through the first pipe 5 from the shaft A to the shaft B, can be reversed there and flow back into the water heater 13 (FIG. 3).

Using this measure, in addition to an optimal use of the heated water, an optimal heat distribution can be achieved along the section L to be cured between the two shafts A and B.

For the extension of the flexible hose 7, in order to press the strip-shaped carrier 4 to the wall, it is sufficient in this case to introduce pressed cold air or cold water, which flows rapidly and primarily cheaply through the hose 7. Small leaks usually present in the hose 7 are irrelevant, because the loss by leakage can easily be compensated by the pump. The hose 7 and the pump necessary for the inflation or the feeding of cold water are omitted in FIG. 3 for the purpose of better clarity.

The duration of the heat treatment of the strip 4 by the influx of hot water and the temperature of the water must be determined on a case to case basis and depends on the resin, which is used as a matrix 3 for the strip 4.

The invention has been described using the laying of a strip-shaped carrier 4, made from textile material and a curable matrix 3, accepting data cables, in non-walkable discharge lines. Of course, the same method can also be used in walkable channels, such as the ones common in bigger cities. Instead of a pressurized hose 7 for a temporary pressure of the strip 4 with the pipes 5 embedded therein, other means, such as for example slats or boards can be used, by which the strip-shaped carrier 4 can be temporarily pressed to the wall 9 at which is to be mounted. Additionally, instead of pipes 5 accepting data wires, pipes for guiding electric cables can also be fastened in this manner. This way it is also possible with the method according to the invention to insert pipes into lines or channels, in which water or gas shall be fed to buildings later on, for example.

Therefore, it is possible within a discharge line also to guide pipes accepting pipelines for fresh water or gas as well as data cables and/or to retrofit them in discharge lines or larger pipelines without having to perform any digging with the respectively high expenses.

What is claimed is:

1. A method of effecting a setting of a heat-hardenable matrix in at least one substantially strip-shaped elongated carrier which confines at least one conduit and is adjacent an internal surface of a pipe which is adapted to be embedded in the ground to convey sewage, water, gases and the like, comprising:
   inserting the strip-shaped elongated carrier, which has a width defined by two side edges, into the pipe and locating the carrier in the pipe with a surface of the carrier between the edges contacting the internal surface of the pipe, and
   conveying only through the at least one conduit and not through a remaining cross-section of the pipe outside of the carrier, a fluid at a temperature which suffices to effect a setting of the matrix.

2. The method of claim 1, wherein the carrier comprises, at least in part, of a textile material.

3. The method of claim 1, wherein said at least one conduit is arranged to confine at least one of the group consisting of data carriers, current conductors, gaseous fluids and liquids.

4. The method of claim 1, further comprising the step of pressing the at least one carrier against the internal surface of the pipe prior to said fluid conveying step.

5. The method of claim 1, wherein said fluid is one of a group consisting of hot water and hot vapors.

6. The method of claim 1, wherein said conveying step includes causing the fluid to flow at least once in a first direction from a first end to a second end and at least once in a second direction from the second end to the first end of the elongated carrier.

7. The method of claim 1, wherein the carrier confines a plurality of conduits and said conveying step includes causing the fluid to flow from a first end to a second end of one of the conduits, thereupon from the second end of the one conduit into a second end of another of the conduits, and thereafter from the second end to a first end of the other conduit.

8. The method of claim 1, further comprising the step of urging the at least one carrier against at least one selected portion of the internal surface of the pipe.

9. The method of claim 8, wherein said urging step includes introducing into the pipe a radially expansible hose and inflating the hose in the pipe to thus urge the carrier against the at least one selected portion of the internal surface of the pipe.

10. The method of claim 8, further comprising the step of pressing the at least one carrier against the internal surface of the pipe at least prior to said fluid conveying step.

11. The method of claim 10, wherein said pressing step includes compressing the at least one carrier between at least one flexible hose and the internal surface of the pipe in the course of said conveying step.

12. The method of claim 1, further comprising the step of urging the at least one carrier against at least one selected portion of the internal surface of the pipe, said urging step including introducing into the pipe a radially expandable hose and inflating the selected portion of the internal surface of the hose, said introducing step including employing a mobile robot which is caused to invert the hose during advancement of the robot in and lengthwise of the pipe.

13. The method of claim 12, further comprising the step of releaseably securing an arm of the robot to a front end of the hose prior to advancement of the robot in the pipe.

\* \* \* \* \*